United States Patent [19]

Shimojo

[11] Patent Number: 5,124,845
[45] Date of Patent: Jun. 23, 1992

[54] INTERIOR REARVISION MIRROR

[76] Inventor: Jin Shimojo, 2-20, Momijigaoka, Fuchu-Shi, Tokyo-To, Japan

[21] Appl. No.: 465,257

[22] PCT Filed: Jul. 29, 1988

[86] PCT No.: PCT/JP88/00765
§ 371 Date: Mar. 28, 1990
§ 102(e) Date: Mar. 28, 1990

[87] PCT Pub. No.: WO90/01434
PCT Pub. Date: Feb. 22, 1990

[51] Int. Cl.⁵ .................. B60R 1/04; B60R 1/12
[52] U.S. Cl. ........................ 359/838; 40/447;
40/541; 40/593; 40/900; 340/756; 340/760;
340/762; 340/794; 340/799; 340/804; 362/83.1;
362/135; 362/140
[58] Field of Search ............... 350/600, 601, 602, 632;
362/83.1, 135, 140; 40/427, 446, 447, 448, 541,
542, 544, 591, 593, 900; 340/461, 464, 756, 760,
762, 781, 782, 794, 799, 804; 359/838 (U.S.
only)

[56] References Cited

U.S. PATENT DOCUMENTS

| 2,182,275 | 12/1939 | Blonkvist | 40/593 |
| 2,600,751 | 6/1952 | Gazda | 362/83.1 |
| 3,665,392 | 5/1972 | Annas | 362/83.1 |
| 4,499,451 | 2/1985 | Suzuki et al. | 362/83.1 |
| 4,555,694 | 11/1985 | Yanagishima et al. | 340/461 |
| 4,631,516 | 12/1986 | Clinker | 340/464 |
| 4,821,019 | 4/1989 | Taylor | 362/83.1 |
| 4,882,565 | 11/1989 | Gallmeyer | 362/83.1 |
| 5,016,996 | 5/1991 | Ueno | 359/838 |

FOREIGN PATENT DOCUMENTS

| 566213 | 7/1960 | Belgium | 40/591 |
| 62-177549 | 3/1987 | Japan . | |
| 0195154 | 8/1989 | Japan | 350/601 |

Primary Examiner—Bruce Y. Arnold
Assistant Examiner—R. D. Shafer
Attorney, Agent, or Firm—Ladas & Parry

[57] ABSTRACT

The present invention relates to an interior rearvision mirror which is provided with a supporting rod (15) secured to an inner roof of a passanger car and a frame (11) movably supported by a front end portion of the supporting rod (15) and wherein a mirror (12) is arranged on the front side of the frame (11) and a display means (13, 20, 31, 41, 50) is arranged on the rear side thereof. According to the location of the display means, necessary display by means of letters or the like can be done for persons positioned external to the passanger car.

1 Claim, 6 Drawing Sheets

INTERIOR REARVISION MIRROR

BACKGROUND OF THE INVENTION

1. Technical Art of Field

The present invention relates to a rearvision mirror arranged in an interior of an automobile or the like and, more particularly, to an interior rearvision mirror assembly suitable for displaying letters or marks thereon.

2. Background Technique

A rearvision mirror for driving an automobile such as passanger car or taxi is usually arranged in an interior thereof.

In general, the interior rearvision mirror assembly, is provided with a frame on the front side thereof for supporting a mirror member and the frame is movably supported to an inner roof of the automobile.

With respect to the passenger car of this type and particularly to taxis, there is provided with a display means for displaying the condition such as "OUT-OF-SERVICE" or "EMPTY" of the passenger car at a portion near a windshield glass, thus making the arrangement near the windshield glass complex.

In view of this matter, it will be convenient to eliminate the arrangement of a display means except for the interior rearvision mirror if a display such as "OUT-OF-SERVICE" or "EMPTY" is provided for the interior rearvision mirror.

DISCLOSURE OF THE INVENTION

An object of the present invention is to provide an interior rearvision mirror arranged in the interior of an automobile capable of externally displaying necessary information or letters by the interior rearvision mirror and of achieving suitable arrangement near the windshield glass of the automobile.

The characteristic feature of the present invention resides in an interior rearvision mirror provided with a frame supported to a roof of an automobile to be movable and having a front side to which a mirror is secured and a rear side to which a display means is disposed.

BEST MODE FOR EMBODYING THE INVENTION

First Embodiment of Interior Rearvision Mirror

The first embodiment of the interior rearvision mirror according to the present invention will be described with reference to FIGS. 1 to 4.

Figure 1:
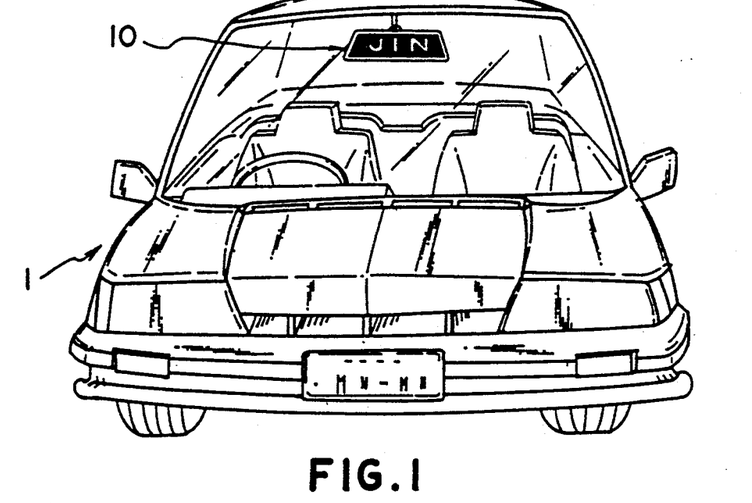
FIG. 1 represents a first embodiment of an interior rearvision mirror according to the present invention and shows a perspective view of a whole structure of a passanger car provided with the interior rearvision mirror.

Referring to FIG. 1, an interior rearvision mirror 10 is arranged in a passenger car 1.

Figure 2:
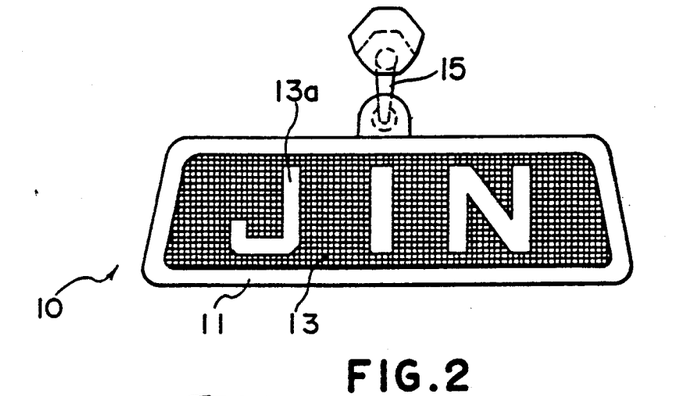
FIG. 2 is a view showing an interior rearvision mirror of FIG. 1 viewed from a side of a display means.
Figure 3:
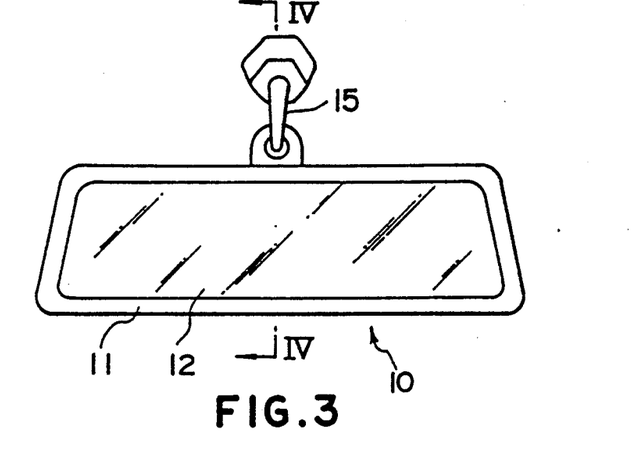
FIG. 3 is a view showing an interior rearvision mirror of FIG. 1 viewed from a side of a mirror.
Figure 4:
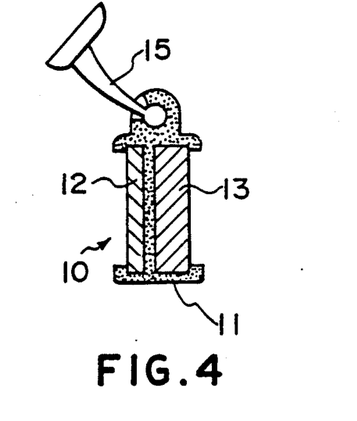
FIG. 4 is a sectional view taken along the line IV—IV of FIG. 3.

The interior rearvision mirror 10 is frame supported by a frame 11 which is supported to be movable by a front portion of a supporting rod 15 secured to a roof of the interior of the passenger car 1 as shown in FIGS. 2 to 4.

A mirror 12 for a driver is provided for the front side (driver's side) of the frame 11 and a display board 13 is provided for the rear side (external side) of the frame 11. The display board 13 is for example made of a colored acrylic plate and necessary letters or marks, for example, letters 13a, is punched out from the display board 13. The display board 13 may be made of a synthetic resin, ceramics, glass or the like plate except for the acrylic plate.

The function of the interior rearvision mirror of the embodiment of the construction described above is as follows.

A driver of an automobile drives the automobile while watching the mirror 12 on the front side of the frame 11 during the driving of the automobile and, during the driving, a person positioned external to the automobile can observe the letters 13a punched out from the display board 13.

As described, according to the described embodiment, since the condition of the automobile can be observed by a person positioned external to the automobile in accordance with the letters 13a of the display board 13 provided for the rear side of the frame 11, it is not necessary to arrange another display means near a windshield glass of the automobile, thus achieving a suitable arrangement near the windshield glass.

Second Embodiment of Interior Rearvision Mirror

The second embodiment of the interior rearvision mirror according to the present invention will be described with reference to FIGS. 5 to 9.

Figure 5:
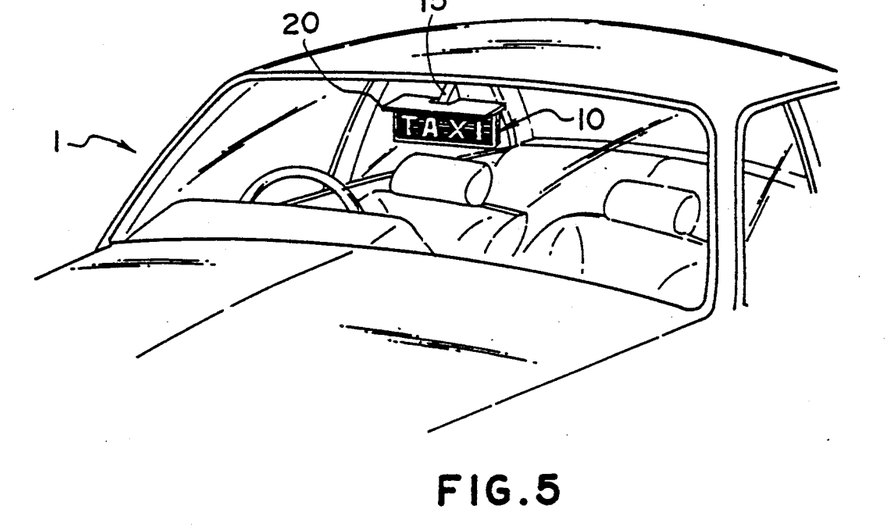
FIG. 5 represents a second embodiment of an interior rearvision mirror according to the present invention and shows a perspective view of a whole structure of a passanger car provided with the interior rearvision mirror.

Referring to FIG. 5, a conventional type interior rearvision mirror 10 is arranged in the interior of a passenger car 1. The interior rearvision mirror 10 is frame supported by a frame 11 having a front side on which a mirror is located and being supported to be movable by a front portion of a supporting rod 15 secured to a roof of the interior of the passenger car 1. A display means 20 is detachably mounted on the rear side (external side) of the frame 11.

The display means 20 will be described hereunder with reference to FIGS. 6 to 9.

The display means 20 is equipped with a display member 21. The display member 21 has one surface provided with engaging claws 24 at upper and lower end portions thereof which are to be engaged with upper and lower end portions of the frame 11 of the mirror 10 and also has the other surface to which a display portion 22 is provided.

The display portion 22 is made of a colored acrylic plate, for example, and necessary letters 22a are punched out from the display portion 22.

The function of the embodiment of the construction described above is as follows.

The display means 20 is first mounted on the rear side of the frame 11 of the interior rearvision mirror of conventional type provided with the mirror on the front side thereof. Namely, the engaging claws 24 of the display means 20 are engaged with the upper and lower end portions of the frame 11 of the interior rearvision mirror to thereby firmly secure the display means 20 to the rear side of the frame 11.

Figure 6:
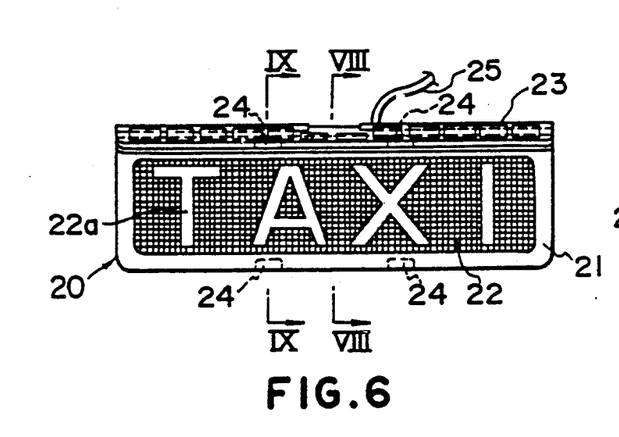
FIG. 6 is a view showing an interior rearvision mirror of FIG. 5 viewed from a side of a display means.
Figure 7:
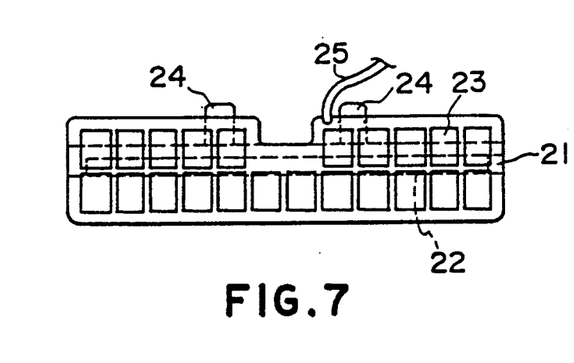
FIG. 7 is a plan view of the interior rearvision mirror shown in FIG. 5.

Accordingly, by mounting the display means 29 on the rear side of the frame 11 of the interior rearvision mirror 10, the display portion 22 of the display means 20 is directed outward of the passenger car 1 and a person positioned external to the car can observe the letters 22a of the display portion 22.

According to this embodiment, the display means 20 can be detachably mounted on the rear side of the frame 11 of the interior rearvision mirror 10 of conventional type, so that the display means is widely applicable to an existing interior rearvision mirror 10.

Figure 8:
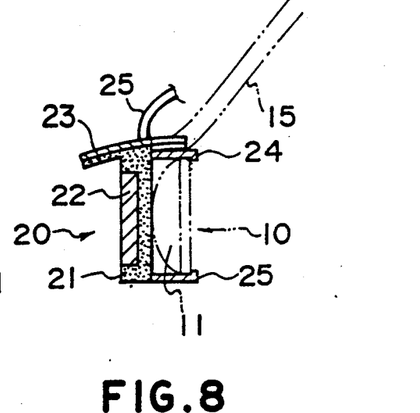
FIG. 8 is a sectional view taken along the line VIII—VIII of FIG. 6.
Figure 9:
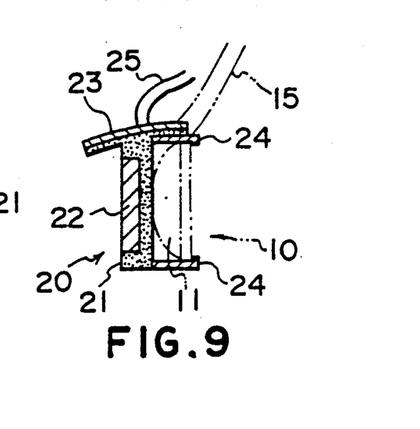
FIG. 9 is a sectional view taken along the line IX—IX of FIG. 6.

In this embodiment, the acrylic plate with the punched letters 22a is described as the display portion 22, but a light emitting diode (LED), electro luminescence (EL) or liquid crystal diode (LCD) may be utilized without limiting to the described embodiment, and in a case where the LED, EL or LCD is utilized for the display portion 22, a power source necessary for such element will be secured by arranging a cable 25 connected between a battery, not shown, of a passenger car and the display portion 22.

Solar cells 23, which may be utilized for a power source of the display portion 22, are arranged above the display member 21.

Third Embodiment of Interior Rearvision Mirror

The third embodiment of the interior rearvision mirror according to the present invention will be described with reference to FIGS. 10 to 12.

Figure 10:
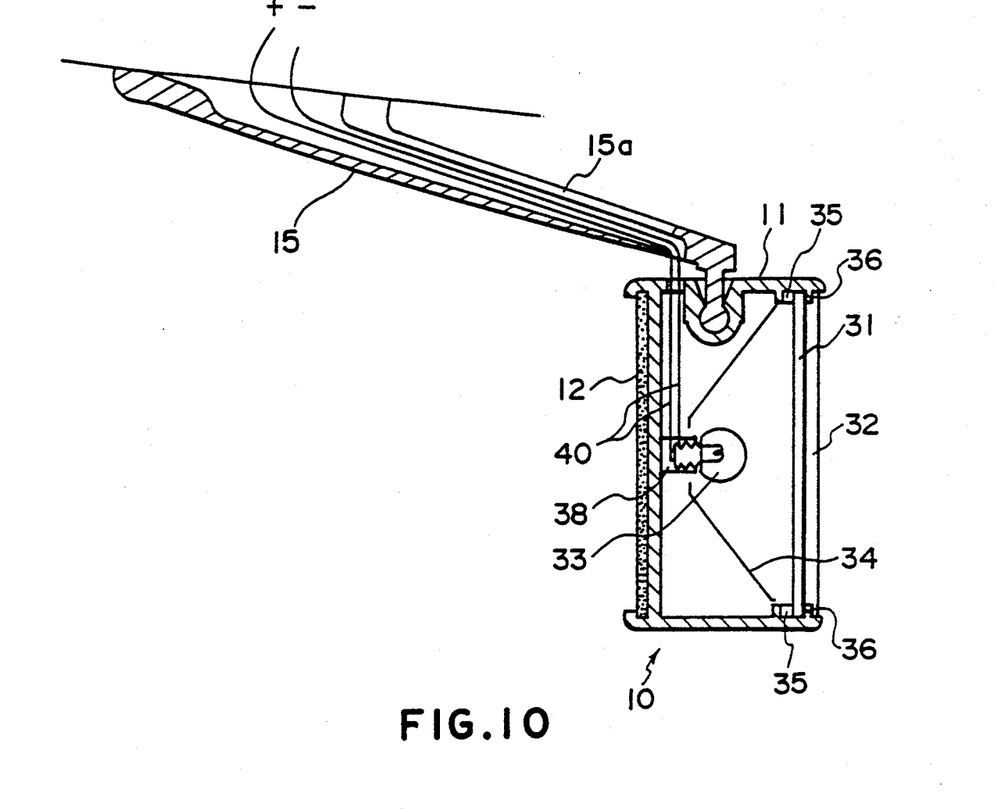
FIG. 10 represents a third embodiment of an interior rearvision mirror according to the present invention.

An interior rearvision mirror 10 shown in FIG. 10 is frame supported by a frame 11 supported to be movable by a front portion of a supporting rod 15 secured to a roof of the interior of the passanger car 1.

The frame 11 is a box-like structure having an inner hollow portion and a mirror 12 for a driver is mounted on the front side of the frame 11. On the rear side of the frame 11 are arranged a display board 31 and a cover 32 in a laminated fashion. Magnets 35 are attached to the peripheral edge of the rear side of the frame 11 and iron pieces 36 are also attached to the peripheral edge of the cover 32 on the side of the display board 31. The display board 31 and the cover 32 are secured to the frame 11 by the engagement of the iron pieces 36 of the cover 32 and the magnets 35.

A socket 38 is provided for a central portion of an inner wall of the frame 11 on the side of the mirror 12 and a lighting source 33 is mounted in the socket 38. A reflecting plate 34 for reflecting a light from the lighting source 33 towards the display board 31 is arranged in the interior of the frame 11.

The socket 38 and a battery, not shown, for the passanger car is electrically connected through cables 40, which are located in an upwardly opened groove 15 formed in the supporting rod 15.

The display board 31 and the cover 32 will be described in detail in conjunction with FIG. 11.

Figure 11:
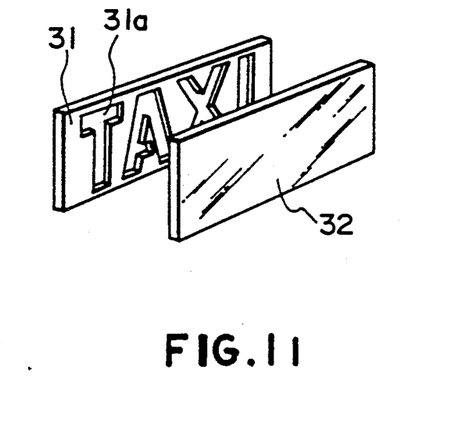
FIG. 11 is a perspective view of one example of a display board and a cover of the interior rearvision mirror shown in FIG. 10.

As shown in FIG. 11, the display board 31 is made of an opaque acrylic plate and provided with punched necessary letters 31a and the cover 32 is made of a translucent acrylic plate.

The function of the embodiment of the construction described above will be described in detail hereunder.

The driver drives an automobile such as passanger car while watching the mirror 12 located on the front side of the frame 11 during the driving of the passanger car.

In a case where a switch, not shown, of the lighting source 33 is in "OFF" state, the letters 31a on the display board 31 are not discriminated externally because the letters 31a are covered by the translucent cover 32.

Next, in a case where the switch of the lighting source is made "ON" by the driver, the light from the lighting source 33 is concentrated on the sides of the display board 31 and the cover 32 by means of the reflecting plate 34. The reflected light passes the display board 31 and the cover 32, whereby the letters 31a of the display board 31 can be discriminated by a person positioned externally.

As described, according to this embodiment, upon the ON-OFF switching operation of the lighting source 33 by the driver, it becomes possible to discriminate the letters 31a on the display board 31 for the external person. In addition, the display board 31 and the cover 32 are secured to the frame 11 by means of the iron pieces 36 of the cover 32 and the magnets 35 attached to the frame 11, so that both the members are easily detachable and the changing of the display board 31 can be also easily done.

Figure 12:
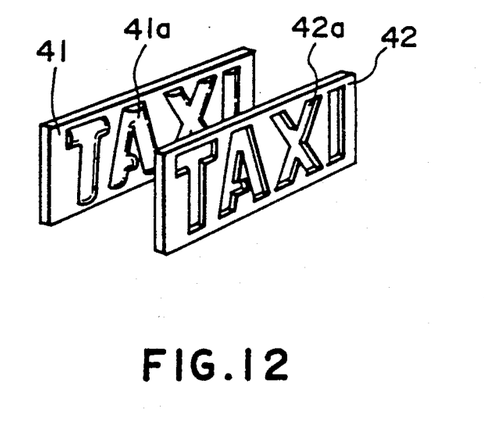
FIG. 12 is a perspective view showing another example of a display board and a cover of the interior rearvision mirror shown in FIG. 10.

In an alternation of this embodiment, a display board 41 and a cover 42 of the type shown in FIG. 12 may be provided for the rear side of the frame 11 in stead of the display board 31 and the cover 32.

Namely, referring to FIG. 12, the display board 41 is made of a translucent acrylic plate and necessary letters 41a on the display board 41 project towards the cover side. The cover 42 is made of a translucent acrylic plate and punched letters 42a corresponding to the letters 41a projecting from the display board 41 are formed on the cover 42.

Fourth Embodiment of The Interior Rearvision Mirror

The fourth embodiment of the interior rearvision mirror according to the present invention will be described hereunder with reference to FIGS. 13 to 17.

Figures 13, 14:
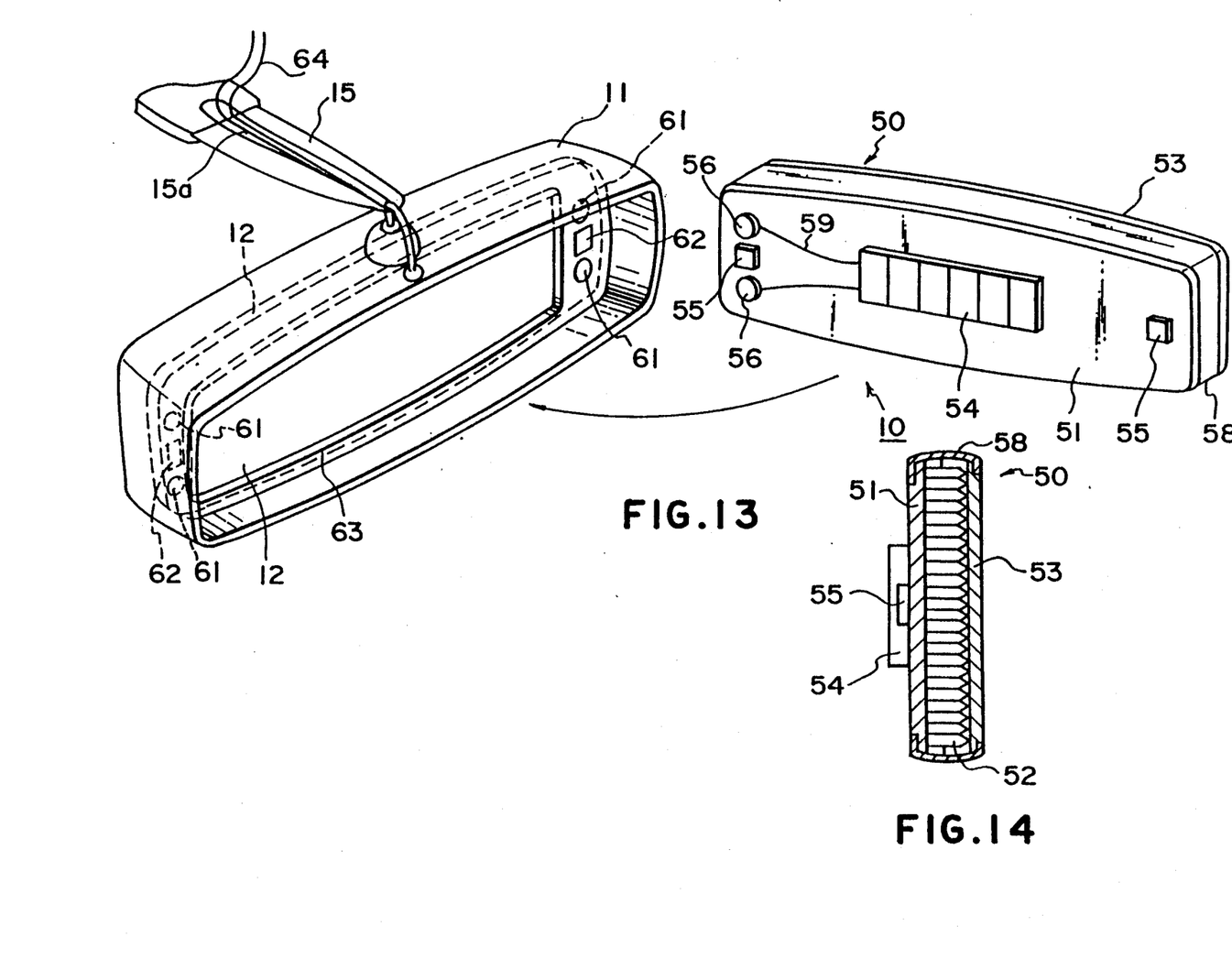
FIG. 13 is a perspective view representing a fourth embodiment of an interior rearvision mirror according to the present invention.
FIG. 14 is a side sectional view of one example of a light emitting means of the interior rearvision mirror of FIG. 13.

Referring to FIG. 13, an interior rearvision mirror 10 is provided with a supporting rod 15 secured to a roof of the interior of an automobile and a frame 11 movably supported by the front end of the supporting rod 15.

The frame 11 is formed in a hollow box-shaped member and a partition plate 63 separating the interior of the frame 11 into front and rear sides are disposed in the interior of the frame 11. The partition plate 63 is provided with a punched-out central portion.

A mirror 12 for a driver is arranged on the front side of the frame 11 and a light emitting means 50 is mounted on the rear side of the frame 11.

The light emitting means 50, as shown in FIGS. 13 and 14, a number of light emitting elements 52 are arranged substantially on the entire one surface of a base plate 51 and the light emitting elements 52 are covered by a film cover 53. The outer periphery of these light emitting elements 52 are covered by a trimming cover 58. A light emitting diode (LED), electroluminescence (EL), or liquid crystal diode (LED) may be utilized for the light emitting element 52.

An integrated circuit (IC) chip 54 is arranged on the other surface of the base plate 51 and contacts 56 are also disposed at one end portion of the surface of the base plate 51 on the side of the IC chip 54 so as to connect the IC chip 54 with wires 59. Iron pieces 55 are secured to both the ends of the IC chip side surface of the base plate 51.

Magnets 62 and contacts 61 arranged on the partition plate 63 of the frame 11 so that the magnets 62 are secured to the iron pieces 55 of the base plate 51 and the contacts 61 abut against the contacts 56 of the base plate 51 when the light emitting means 50 is mounted on the rear side of the frame 11.

While, the contacts 61 on the partition plate 63 are connected to a battery, not shown, of a passanger car and the like through cables 64, which are disposed in the upwardly opened groove 15a formed in the supporting rod 15.

The control of the lighting of the light emitting means 50 is performed by the IC chip 54, which will be described in detail with reference to FIG. 15.

To the base plate 51 of the light emitting means 50 is connected a character generator 65 to which a memory 66, a decoder 67 and a switch 68 are connected in this order. The character generator 65, the memory 66, the decoder 67 and the switch 68 constitute a lighting control means.

Within these elements, the character generator 65 lights a predetermined light emitting element 52 on the base plate 51 by conducting necessary current to the base plate 51. The memory 66 is provided with a plurality of memory areas in every each of which coordinate position information (for example, coordinate information regarding such as "OUT-OF-SERVICE" or "EMPTY") of the light emitting element 52 to be lightened is stored. The decoder 67 reads a selection signal from the switch 68 and outputs a predetermined address signal to the memory 66. The coordinate position information stored in the memory is made writable from the outside.

The character generator 65, the memory 66 and the decoder 67 are arranged in the IC chip 54.

The function of this embodiment of this construction will be described hereunder.

The light emitting means 50 is first mounted on the rear side of the frame 11 and the iron pieces 55 on the base plate 51 are secured to the magnets 62 on the partition plate 63 to thereby secure the light emitting means 50 to the rear side of the frame 11.

A driver drives a passanger car while watching the mirror 12 on the front side of the frame 11 during the running of the car.

Next, the driver switches the switch 68 to a desired position to display desired letters by means of a number of the light emitting elements 52 arranged on the entire one surface of the base plate 51.

Figure 15:
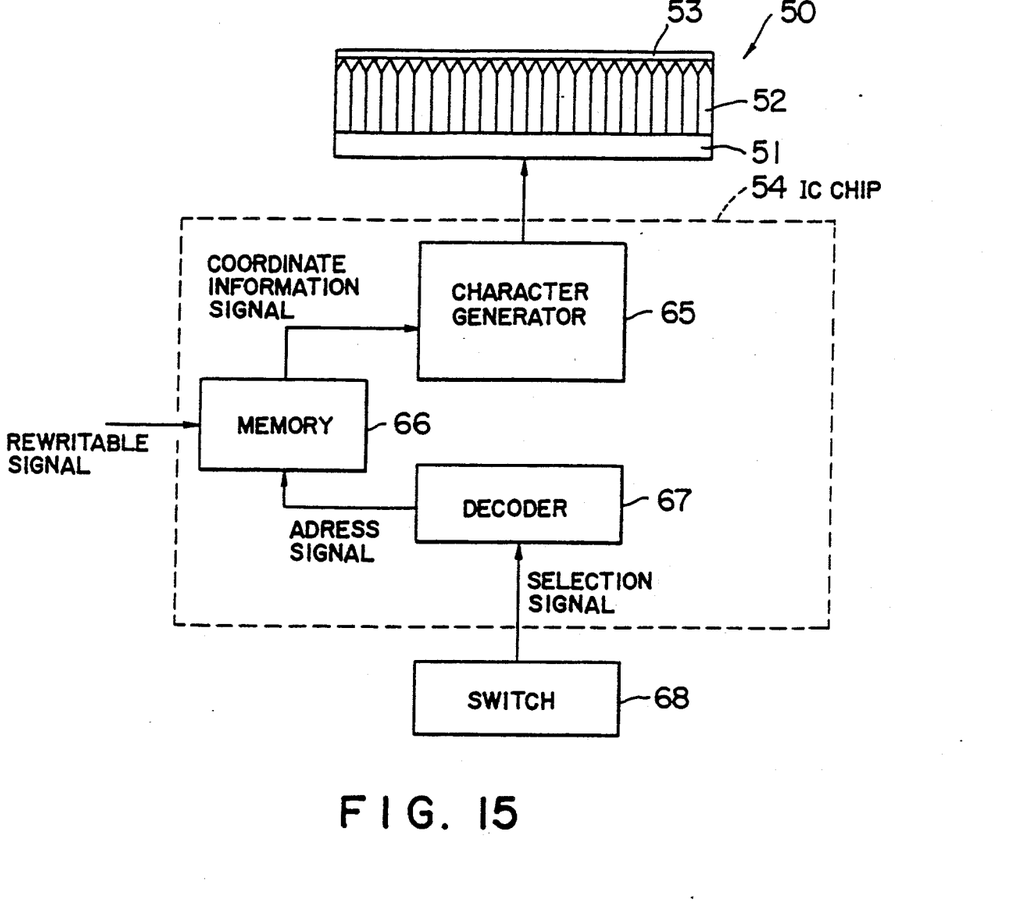
FIG. 15 is a diagramatical view for the explanatory of emission control of the interior rearvision mirror of FIG. 13.

Namely, as shown in FIG. 15, when the driver switches the switch 68 to the desired position (for example, to "OUT-OF-SERVICE"), the switch 68 outputs the selection signal to the decoder 67, which reads the selection signal and then transmits the predetermined address signal to the memory 66.

The memory 66 transmits the predetermined coordinate position signal to the character generator 65 in accordance with the address signal from the decoder 67. The character generator 65 conducts electric current necessary for lighting the predetermined light emitting element 52 arranged on the one surface of the base plate 51. The lighting of the light emitting element 52 displays the predetermined letters or characters such as "OUT-OF-SERVICE" to a person positioned externally.

In the next step, when the driver switches the switch 68 to show the condition of "EMPTY", the light emitting element 52 is lighened in the manner substantially the same as that described above to display the letters of "EMPTY".

In accordance with the manner described above, the letters to be displayed by the lighting of the light emitting elements 52 will be optionally changed to "TAXI", "STOP" or the like except for "OUT-OF-SERVICE" or "EMPTY".

Figure 16:
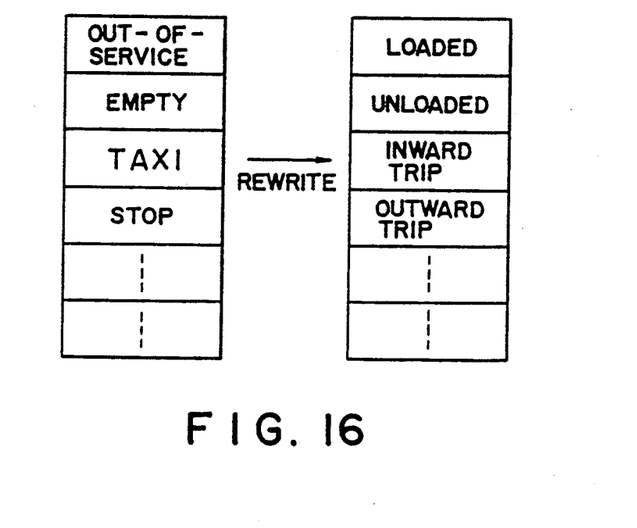
FIG. 16 is a view for the explanatory of reloadable function of a memory shown in FIG. 15.

The coordinate position information to be stored in the memory 66 is rewritable from the external position The letters to be displayed by the light emitting elements 52 can be rewritten to letters such as shown in FIG. 16 in accordance with types of passanger cars in which the interior rearvision mirrors are arranged by rewriting the coordinate position information of the memory 66.

Figure 17:
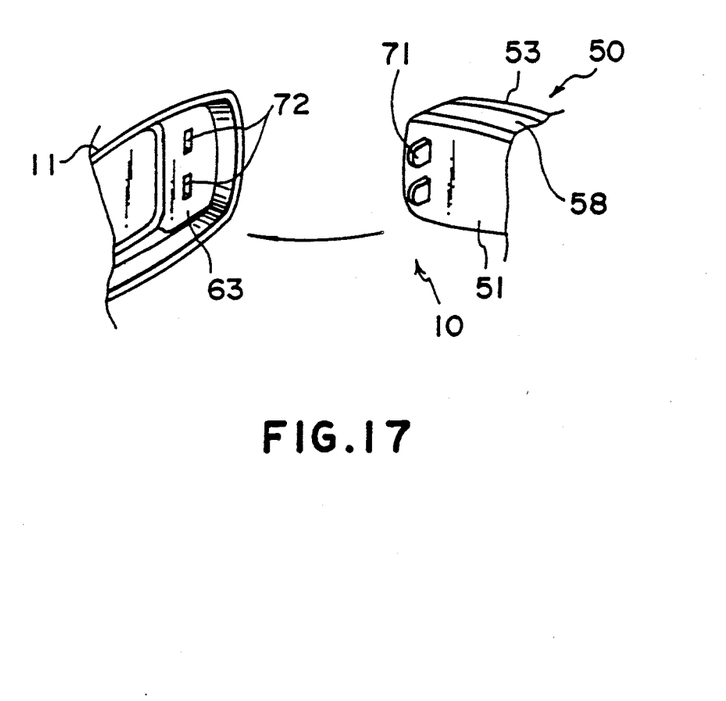
FIG. 17 is a perspective view of the light emitting means of the interior rearvision mirror of FIG. 15 provided with a contact.

In the described embodiment, there is shown an example in which the contacts 56 of the base plate 51 abut against the contacts 61 of the partition plate 63 in a case where the light emitting means 50 is mounted to the rear side of the frame 11. In an alternation, however, a plug 71 arranged to the base plate 51 may be inserted into a concent hole 72 of the partition plate 63.

Figure 18:
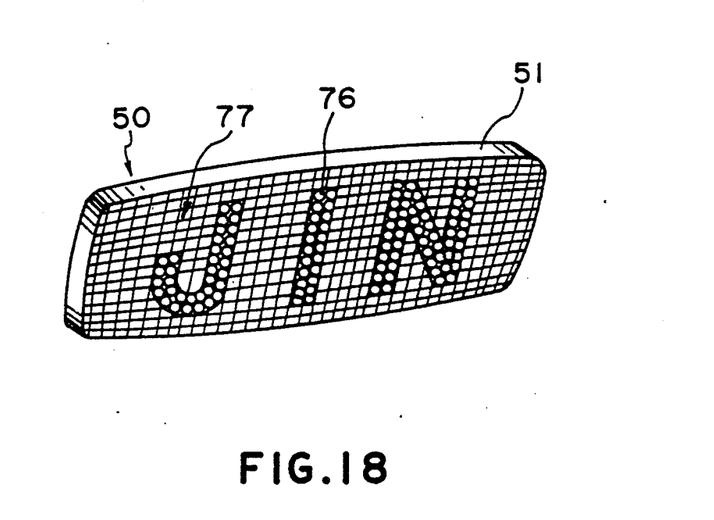
FIG. 18 shows a perspective view of another example of a light emitting means of the interior rearvision mirror of FIG. 13.

The embodiment also show an example in which a number of light emitting elements 52 are arranged on substantially the entire one surface of the base plate 51. The embodiment, without being limitted thereto, may include an example, such as shown in FIG. 18, in which light emitting elements 76 may be arranged on a portion of letters "JIN" of the base plate 51 and solar cells 77 for power source are arranged on the other portion of the base plate 51. In such example, the solar cells 77 can be utilized as a power source regardless of the battery of the passanger car.

The embodiment further shows an example in which optional letters can be displayed by the light emitting elements 52, but an LCD may be substituted for the light emitting elements 52 without being limited thereto so as to utilize the LCD as a television screen. In such case, the driver can observe an image on the television screen through the light emitting elements 52 of the light emitting means mounted to the rear side of the frame by stopping the car and rotating the interior rear-vision mirror 10.

INDUSTRIAL USAGE

It is made possible to display necessary letters or the like to a person positioned external to a passanger car by arranging an interior mirror according to the present invention in an interior of an automobile such as delivery car, taxi or passanger car. The interior mirror may be utilized as a television screen except for the display of the letters by utilizing an LCD as light emitting element for a light emitting means. A select switch means may be located in association with a meter of the taxi to display or flash information such as EMPTY CAR, RESERVE, EXTRA, OUT-OF-SERVICE, SOS or DIRECTION. In addition, it may be possible to light emit and display the speed as digital display means in association with a speed meter in place of a speed display light of a truck. The interior mirror may be utilized as a light for mood lighting means by color illuminating the entire surface of the light emitting means. An medical emergency packing, an out-of order, an under derivery, an under collection, an under construction, an in-service, a firm name, product name, number of not-private cars and the like may be light emitted or flash displayed by the light emitting means. The light emitting means may be utilized for the flash display by providing a flashing function to an opposing car and a stop information for the road crossing of a walker to the light emitting means. Moving messages in form of electronic display news, for example, of commercial media may be displayed by the light emitting means. Information in forms of such as marks, colors, patterns, letters, numerals, signals or the like may be displayed by using a fluorescent coating or fluorescent substance. In addition, term for inspection or 6-month periodical inspection may be displayed on the light emitting means in association with the memory. Moreover, an inspection sticker, a periodical inspection sticker or seal or the like may be applied to a portion not used for the display of the display means. Furthermore, the display means may be utilized for a receiver for a light communication system. The display means may be further utilized for a light collecting plate for a solar cell.

I claim:

1. An interior rearvision mirror for a vehicle comprising a frame (11) provided with a mirror (12) on a front side thereof and mounted within a vehicle to be visible through the front window thereof, and display means (50) on a rear side of the frame (11) facing outwardly through the vehicle front window, wherein the display means (50) is composed of a base plate (51) and light emitting means provided with a number of light emitting elements (52, 76) arranged on a portion of a surface of the base plate (51) for forming letters, and solar cells for providing power to the light emitting elements are arranged on another portion of the surface of the base plate (51) adjacent to the surface portion containing said light emitting elements (52), wherein the light emanating from the light emitting elements (52) is controlled by light emission control means, wherein the light emission control means comprises a switch (68) for optionally selecting one of a plurality of selection signals, a decoder (67) into which a selection signal from the switch (68) is input, the decoder reading the selection signal and outputting a corresponding address signal, memory means (66) into which the address signal from the decoder (67) is input and from which a corresponding coordinate position signal is output, and a character generator (65) for conducting necessary current to a light emitting element (52) on the base plate (51) selected in accordance with the coordinate position signal from the memory means (66) to energize the selected light emitting element (52).

* * * * *